March 29, 1927.
H. O. PORTER
GAS BURNER
Filed July 21, 1926
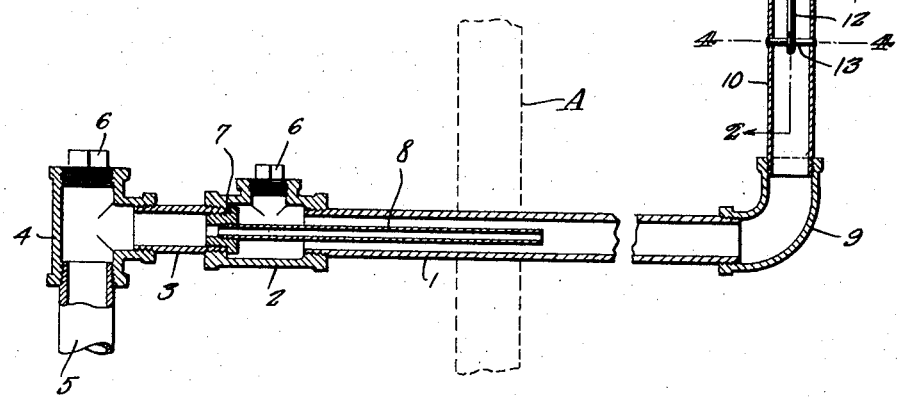
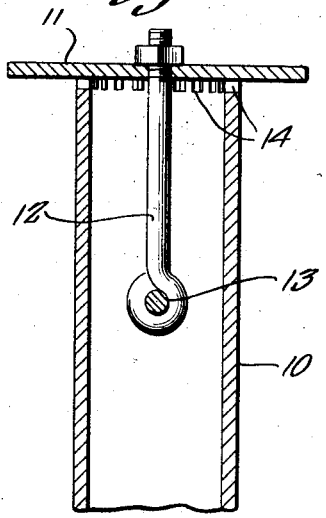
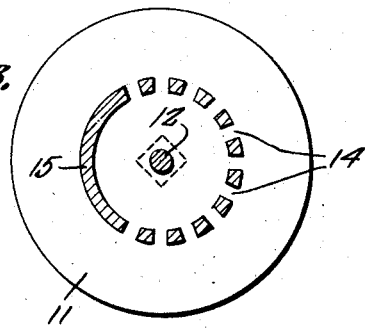
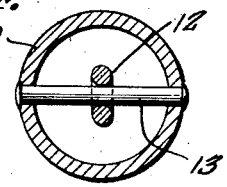
1,622,972
H. O. Porter,
INVENTOR
BY Victor J. Evans
ATTORNEY
WITNESS:

Patented Mar. 29, 1927.

1,622,972

UNITED STATES PATENT OFFICE.

HOMER O. PORTER, OF DENOYA, OKLAHOMA.

GAS BURNER.

Application filed July 21, 1926. Serial No. 124,004.

This invention relates to a gas burner which is mainly designed for natural gas but which may be used for other kinds of gas, the general object of the invention being to provide means for holding the gas under pressure and allowing it to escape through small perforations which are arranged under a projecting surface so that the gas will mix with the air exteriorly of the burner while passing under the said surface so as to produce a flame of intense heat.

Another object of the invention is to so arrange the perforations that the flames will be directed away from the front or door portion of the furnace and toward the rear of said furnace.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a longitudinal sectional view through the improved device.

Figure 2 is a section on line 2—2 of Figure 1.

Figure 3 is a section on line 3—3 of Figure 1.

Figure 4 is a section on line 4—4 of Figure 1.

In these views, 1 indicates a pipe which is adapted to be passed through a hole formed in a part of a furnace which is shown at A in dotted lines in Figure 1. A T-coupling 2 is threaded to the outer end of the pipe and a sleeve 3 connects the coupling with a second T-coupling 4 which receives the supply pipe 5. The outlet of each coupling, which is not being used, is closed by a plug 6. A reducer 7 is threaded in the sleeve or pipe 3 and a small tube 8 is threaded in the reducer and extends well into the pipe 1. An elbow 9 is connected with the inner end of the pipe 1 and a short length of pipe 10 is threaded in the elbow so that the said pipe 10 is vertically arranged. The top of the pipe is closed by a circular plate 11 which is held in place by an eye bolt 12, the eye of which engages a cross piece 13 in the pipe 10. The top of the pipe 10 is provided with the notches 14 but the front portion of the pipe is not provided with these notches but is solid, as shown at 15. These notches are directly under the plate which is of considerably larger diameter than the pipe 10 so that the gas passing through the notches will flow along the under side of the plate before passing upwardly.

The small tube 8, expelling the gas in the larger space formed by the pipe 1 and elbow 9, acts to increase the pressure of the gas entering the device and this pressure is retained by the plate 11. The gas therefor escapes with considerable force from the notches and as the streams of gas pass along the bottom of the plate 11, it is mixed with the air so that the mixture is inflammable by the time it reaches the edge of the plate. At this point, the mixture burns with an intense blue flame so that the furnace is quickly heated to a high degree with the minimum amount of fuel.

The plugs 6 afford means for using the device to burn oil by attaching a steam pipe to the coupling 2 and removing the burner part of the device.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A burner for natural gas comprising an L-shaped tubular part having one portion horizontal and the other vertical, the vertical part having notches in its upper end, a plate covering the upper end and being of greater diameter than the vertical part, an eye bolt connected with the plate and depending into the vertical part, a cross piece carried by the vertical part and passing through the eye of the bolt and means for introducing natural gas into the horizontal part under compression and without mixing the same with air.

In testimony whereof I affix my signature.

HOMER O. PORTER.